United States Patent
Majewski

[15] 3,650,705
[45] Mar. 21, 1972

[54] POTASSIUM PYROPHOSPHATE PEROXYHYDRATES AND METHOD OF PREPARING THE SAME

[72] Inventor: Helmut W. Majewski, Yonkers, N.Y.

[73] Assignee: Stauffer Chemical Company, New York, N.Y.

[22] Filed: Aug. 21, 1968

[21] Appl. No.: 754,459

[52] U.S. Cl. .............................................23/315, 23/106 R
[51] Int. Cl. ..................................C01b 15/00, C01b 25/16
[58] Field of Search........................................23/315, 106 R

[56] References Cited

UNITED STATES PATENTS 3,035,897  5/1962  Habernickel ............................23/315
3,140,149  7/1964  Habernickel ............................23/315

OTHER PUBLICATIONS

Van Wazer: " Phosphorus and Its Compounds," pages 626–627, and 824, Vol. I, Interscience Publishers, Inc., 1958, New York, New York.

Primary Examiner—Oscar R. Vertiz
Assistant Examiner—Hoke S. Miller
Attorney—Paul J. Juettner, Wayne C. Jaeschke and Martin Goldwasser

[57] ABSTRACT

Potassium pyrophosphate peroxyhydrates containing at least 30 weight percent bound hydrogen peroxide are prepared by forming a saturated solution of potassium pyrophosphate in concentrated hydrogen peroxide and crystallizing out the product from the saturated solution. Also prepared is the new compound potassium pyrophosphate heptaperoxyhydrate.

1 Claims, No Drawings

POTASSIUM PYROPHOSPHATE PEROXYHYDRATES AND METHOD OF PREPARING THE SAME

SPECIFICATION

The present invention relates to a new group of peroxyhydrates of potassium pyrophosphate and to their method of preparation.

Peroxyhydrates of potassium pyrophosphate are known compounds, and, when dissolved in water, provide a mixture equivalent to a physical mixture of hydrogen peroxide and the pyrophosphate. The aqueous solutions give reactions typical of each component of the compound and thus these compounds are advantageous as a dry source of hydrogen peroxide for dry blending in such formulations as detergents. Peroxyhydrates of potassium pyrophosphate have been prepared by admixing potassium pyrophosphate with dilute solutions of hydrogen peroxide, and evaporating the solution to dryness in vacuum at room temperature (Phosphorus and Its Compounds, Van Wazer, Vol. I at pages 626, 627 and 824). The product of this reaction is low in hydrogen peroxide content and contains less than 25 weight percent bound hydrogen peroxide (approximating the formula $K_4P_2O_7 \cdot 3H_2O_2$). The product is highly deliquescent, and is a tacky agglomerate which is hard to handle.

It has now been found that by an easy and economical process a new group of peroxyhydrates of potassium pyrophosphate can be prepared which have a higher percentage concentration of hydrogen peroxide, which are less deliquescent and which are more stable when kept in a cool dry place than the heretofore known materials, and which are dry, untacky, and easily handleable granulars, particularly when stored in a cool dry place.

In accordance with the present invention, there is provided a new group of peroxyhydrates of potassium pyrophosphate which contain at least 30 weight percent bound hydrogen peroxide and which are prepared by dissolving potassium pyrophosphate in concentrated hydrogen peroxide until a saturated solution is obtained and crystallizing out the product from the saturated solution. The product is a peroxyhydrate of potassium pyrophosphate containing at least 30 percent hydrogen peroxide and preferably above 40 percent hydrogen peroxide and is in the form of dry white crystals which are non-deliquescent and easily handleable.

Potassium pyrophosphate is a well known compound and can be used either as the hydrate or in the anhydrous form. It is preferred that the potassium pyrophosphate salt be anhydrous and be a substantially pure form for use in the present invention. The preferred anhydrous salt is usually prepared by dehydrating dipotassium hydrogen phosphate at temperatures above 250° C. and preferably from 350° C. to 400° C. As the preferred salt, i.e., anhydrous potassium pyrophosphate, it is used herein as the basis for any quantative calculations and the weight of any water of hydration as would be present in the hydrate is to be considered part of the aqueous phase of the reaction mixture.

The hydrogen peroxide for use in the present invention can be prepared by any known method and is conveniently utilized in aqueous solutions having a concentration of at least 50 percent hydrogen peroxide. At concentrations of below 50 percent by weight hydrogen peroxide, the desired products are not obtained, a viscous, syrupy liquid is formed and no crystalline product can be recovered. While 100 percent pure hydrogen peroxide can be used, it is preferred that, for ease of handling, aqueous solutions having from about 65 percent to about 90 percent by weight hydrogen peroxide be used. The aqueous portion of the solution can be constituted by water from any source, though it is preferred that the water be of a deionized nature.

The peroxyhydrates of the present invention are prepared by forming a saturated solution of potassium pyrophosphate in concentrated $H_2O_2$ and crystallizing out the desired product. The saturated solution is preferably formed by continuously adding the phosphate salt to a hydrogen peroxide solution of at least a 50 percent concentration until a saturated solution is formed. During the addition, an exothermic reaction occurs between the potassium pyrophosphate and the hydrogen peroxide and sufficient heat is generated to substantially elevate the temperature of the reaction solution. In as much as the peroxyhydrates are sensitive to elevated temperature, the temperature is preferably maintained below 50 ° C. by controlling the rate of potassium pyrophosphate salt addition or by cooling or by both. It is preferred to conduct the preparation of the products of the present invention at slightly elevated temperatures of around 40° C. so as to facilitate the later crystallization of the product.

The saturated solution can also be made by dissolving a large amount of potassium pyrophosphate (the amount being that required to form the saturated solution of $K_4P_2O_7$ at concentrations of above 50 percent $H_2O_2$) to a weak hydrogen peroxide solution, e.g., 30 percent and evaporating excess moisture to concentrate the hydrogen peroxide solution so as to obtain the desired saturated solution of potassium pyrophosphate in concentrated hydrogen peroxide.

The product can also be made by dissolving potassium pyrophosphate in a weak hydrogen peroxide solution to which is added concentrated hydrogen peroxide (90 percent solution) and to which is added further potassium pyrophosphate until the solution is saturated. This "step wise" preparation of the solution operates equally as well as the preferred batch procedure in providing the desired final product. By the use of this alternate procedure, the peroxyhydrates of the invention can be prepared by continuously adding reactants and continuously removing liquor for crystallization, in a continuous reaction procedure. Also, mother liquors from previous batches can be recycled for further use by proper adjustment of chemical constituents. By saturation or saturated solution as used herein, it is intended to include solutions which are substantially saturated and which can be crystallized by a change in temperature or slight evaporation so as to bring the concentration at the point of crystallization to saturation.

In any of the aforedescribed procedures, the solutions used in the present invention are concentrated hydrogen peroxide solutions saturated with potassium pyrophosphate. In general, and for the preparation of the peroxyhydrate having from about 40 to about 43 weight percent bound hydrogen peroxide, it has been found that the amount of hydrogen peroxide and correspondingly, the amount of potassium pyrophosphate in the solution should provide a mole ratio of $H_2O_2/K_4P_2O_7$ of at least 7:1 in at least a 65 percent hydrogen peroxide solution. Using the foregoing, the proportion of reactants utilized in any of the aforedescribed procedures can be easily determined by one skilled in the art.

The desired end product of the saturated reaction mixture is separated from the liquid phase by crystallization. Any known method for effecting such crystallization can be used in the present invention, though it is preferred to effect the crystallization by reducing the temperature of the saturated solution. Reduction of the temperature can be easily accomplished by immersing the reaction vessel in ice water. Other means of affecting such reduction would be obvious to one skilled in the art.

Following crystallization, the product is recovered from the mother liquor, preferably by filtration, and dried. Due to the sensitivity of these materials to heat, the use of elevated temperature drying conditions should be avoided as they tend to decompose the peroxyhydrate. Air drying or the use of vacuum drying plus desiccant at room temperatures of from about 20° C. to about 30° C. is preferred for drying the product.

The product of the present invention are dry free-flowing, non-deliquescent granules having large amounts of available hydrogen peroxide. The product has at least 30 weight percent bound hydrogen peroxide and preferably between 40 and 43 weight percent peroxide. The amount of peroxide in the final product is dependent on the concentration of the hydrogen peroxide in the original reaction mixture, the lower weight percents of hydrogen peroxide in the product corresponding to products prepared using solutions of low concentration of $H_2O_2$. Using concentrations of hydrogen peroxide of less than about 65 percent $H_2O_2$, products having less than about 40 percent hydrogen peroxide are formed while at 65 percent $H_2O_2$ concentration and above, products having from 40–43 percent $H_2O_2$ are formed. These latter products correspond to the formula:

I.     $K_4P_2O_7 \cdot 7H_2O_2$

The above product is isolatable and identifible and is the preferred product.

The products of the present invention are useful as bleaching agents, detergent additives, disinfection agents and the like.

The invention will be further illustrated in the examples which follow.

EXAMPLE 1

90 grams anhydrous potassium pyrophosphate was added over a period of an hour and a half to 102 grams of a 65 percent hydrogen peroxide solution with stirring so as to maintain the temperature around 40° C. Some crystallization took place upon the completion of the pyrophosphate addition and these crystals were separated by filtration (Sample 1–A). The filtrate was cooled in an ice bath with stirring for about 2 hours during which time a white precipitate was formed. The precipitate was filtered, dried over $P_2O_5$ overnight and then vacuum dried (Sample 1–B). The sample obtained at the end of the potassium pyrophosphate addition (Sample 1–A) showed by analysis to contain 40.6 percent hydrogen peroxide and have a weight loss at 500° C. of 40.4 percent. The sample obtained after crystallization in the ice bath (Sample 1–B) showed a hydrogen peroxide content of 41.1 percent and a weight loss of 500° C. of 40.6 percent. This corresponds to the approximate formula $K_4P_2O_7 \cdot 7H_2O_2$.

Sample 1–B was subjected to X-ray diffraction analysis with the following results:

TABLE I

X-ray diffraction analysis: d-spacings (in angstroms)

| Decreasing intensity | $K_4P_2O_7 \cdot 3H_2O$ | Product Example 1 $K_4P_2O_7 \cdot 7H_2O_2$ Sample 1–B | ASTM reported values | |
|---|---|---|---|---|
| | | | $K_4P_2O_7 \cdot 3H_2O$ | $K_4P_2O_7$ |
| | 3.04 | 2.85 ⟵⟶ | 2.88 | 2.92 |
| | 3.75 | 3.08 | 2.97 | 4.85 |
| | 3.17 | 2.78 ⟵⟶ | 2.76 | 3.53 |
| | 6.91 | 3.25 | | |

As can be seen from the above data, the 7-peroxyhydrate is an identifible and analyzable product which is quite different from the 3-peroxyhydrate. The 3-hydrate shows some similarities in the strongest peaks with the 7-peroxyhydrate, as indicated by the arrows. However, in their entirety, the two X-ray patterns are different. That the 3-hydrate and the 7-peroxyhydrate are different is supported by the fact that the 3-hydrate loses 2 moles of water at 180° C. and the third at 300° C., whereas differential thermal analysis of the 7-peroxyhydrate showed no such loss. The overall conclusion of the X-ray analysis and other chemical analysis is that a separate and distinct compound has been prepared and identified as potassium pyrophosphate heptaperoxyhydrate.

The product of Example 1 can also be prepared using the procedure of Example 1 and, in place of the 90 grams of anhydrous potassium pyrophosphate, 103 grams of potassium pyrophosphate trihydrate; and/or, in place of the 102 grams of the 65 percent hydrogen peroxide solution there can be used 89 grams of a 75 percent hydrogen peroxide solution or 66.3 grams or pure hydrogen peroxide. The foregoing are given as illustrative of the numerous combinations of reactants and hydrogen peroxide combinations which can be used in the present invention, and applicant is intended not to be limited thereto.

EXAMPLE 2

77 grams of anhydrous potassium pyrophosphate was added slowly over a period of 3 hours to 71 grams of a 60 percent hydrogen peroxide solution with stirring so as to maintain the temperature below 50° C. A viscous solution, milky due to the release of oxygen, was obtained. The solution was filtered and the filtrate was cooled in an ice bath for 2 hours during which time a white precipitate was formed. The resulting precipitate was filtered, dried over $P_2O_5$ overnight and vacuum dried. The final product contains 35.7 percent hydrogen peroxide (by $KMnO_4$ titration) and a 36.0 percent weight loss was obtained upon heating the product to 500° C. This approximates the formula $K_4P_2O_7 \cdot 5.36H_2O_2$.

EXAMPLE 3

45 grams of anhydrous potassium pyrophosphate was slowly added to 57 grams of a 90 percent hydrogen peroxide solution with stirring over a period of 2 hours to maintain the reaction temperature below 50° C. After the addition was complete, the reaction mixture was cooled in an ice bath for 1 to 2 hours during which time a white precipitate was formed. The resulting precipitate was filtered, dried over $P_2O_5$ overnight and vacuum dried for 5 hours. The product is white granules which cake slightly on standing. Analysis ($KMnO_4$ titration) shows a hydrogen peroxide content of 42.2 weight percent. Upon heating the product to 500° C., a weight loss of 42.6 percent occurs. Theoretical weight percent hydrogen peroxide for $K_4P_2O_7 \cdot 7H_2O_2$ is 41.9 percent.

EXAMPLE 4

Potassium pyrophosphate heptaperoxyhydrate was prepared by a step-wise procedure involving the steps of dissolving 50 grams of anhydrous potassium pyrophosphate in 50 grams of a 27 percent hydrogen peroxide solution; adding to this solution dropwise 88 grams of an 88 percent hydrogen peroxide solution with stirring; adding to this mixture 59.5 grams of anhydrous potassium pyrophosphate; and cooling the mixture in an ice bath to obtain the crystalline product. The product is vacuum dried over $P_2O_5$ to give a dry, granular, white, non-deliquescent, free-flowing powder. The product was found to contain 25.4 percent $P_2O_5$, 41.7 percent $H_2O_2$ for which the formula $K_4P_2O_7 \cdot 7H_2O_2$ can be written (Theory: 24.96 percent $P_2O_5$ and 41.89 percent $H_2O_2$). A sample was heated to 500° C. and the weight loss was 41.8 percent, equivalent to the amount of $H_2O_2$ present and indicating that no water of hydration is present. Titration with Karl Fisher reagent gave 0.1 percent $H_2O$.

EXAMPLE 5

195.5 grams of potassium pyrophosphate was added to 100 grams of a 30 percent hydrogen peroxide solution over a period of 4 hours. During the addition, the solution became quite cloudy due to the formation of gas bubbles indicating the decomposition of hydrogen peroxide. The solution which was quite syrupy was filtered and cooled in an ice bath for several hours. It remained cloudy and no crystals were formed.

EXAMPLE 6

174 grams of anhydrous potassium pyrophosphate was added to 111 grams of a 45 percent solution of hydrogen peroxide as in the previous example. The solution became quite viscous and cloudy but contained no crystals. Upon cooling in an ice bath, no crystallization was effected.

EXAMPLE 7

Potassium pyrophosphate heptaperoxyhydrate was prepared by dissolving 66 grams of anhydrous potassium pyrophosphate in 230 grams of a 24 percent hydrogen peroxide solution and concentrating the solution by evaporation. Evaporation was accomplished by means of a rotary drier at 40° C. and the distillate was condensed and collected. After 1.5 hours of evaporation, crystals appeared; the evaporation was stopped, the solution was cooled, and the product was filtered off. The distillate weighed 146 grams and contained 1.05 grams of hydrogen peroxide. The resulting hydrogen peroxide reaction solution had a concentration of about 64 percent hydrogen peroxide. The final product contained 42.19 percent hydrogen peroxide (by $KMnO_4$ titration) and a 42.57 percent weight loss was obtained upon heating to 500° C. Theoretical weight percent hydrogen peroxide for $K_4P_2O_7 \cdot 7H_2O_2$ is 41.9 percent.

What is claimed is:

1. Potassium pyrophosphate heptaperoxyhydrate.

\* \* \* \* \*